Feb. 16, 1971 E. R. CASALE 3,563,114
FORWARD AND REVERSE PLANETARY GEARING
Filed July 22, 1969 2 Sheets-Sheet 1
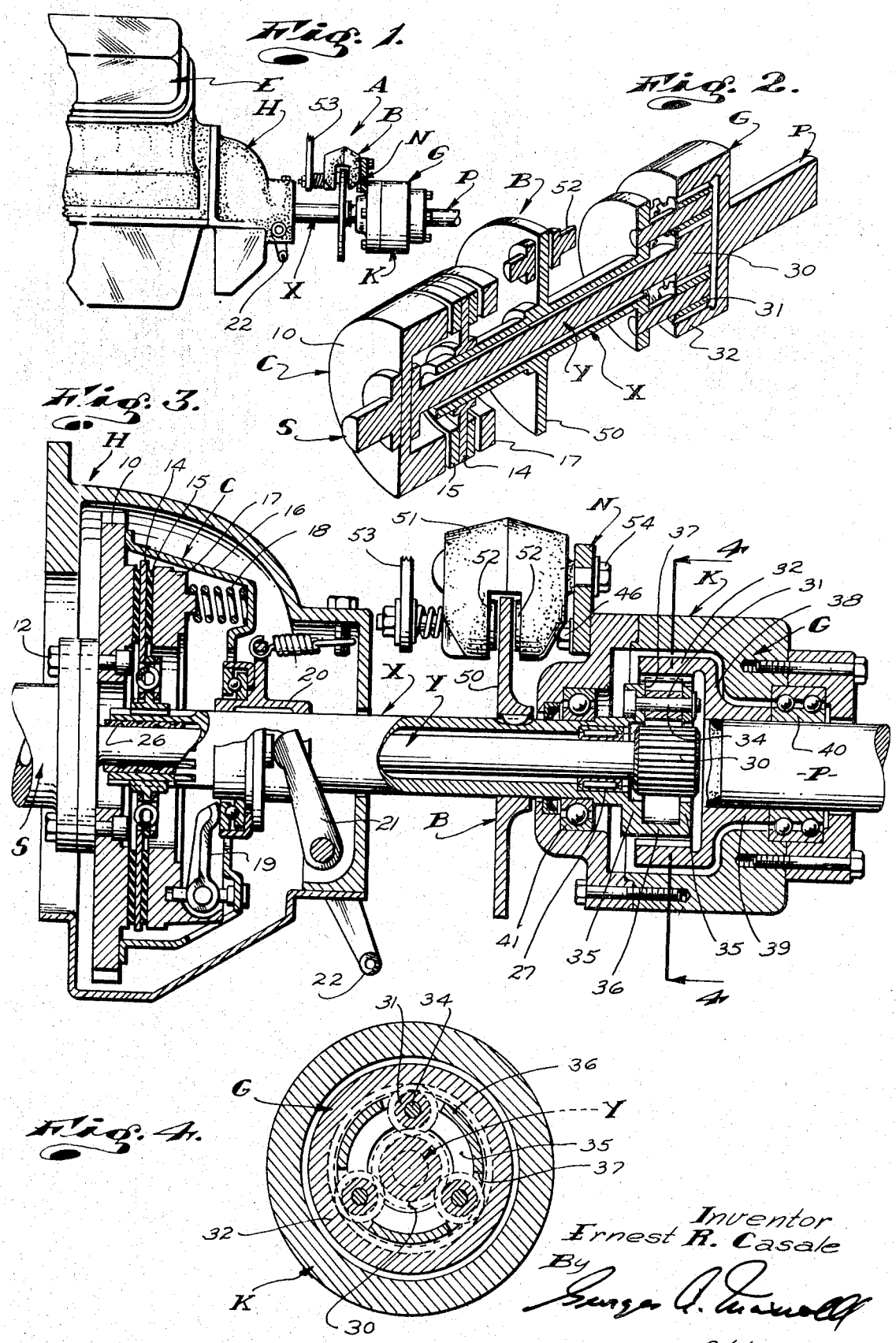
Inventor
Ernest R. Casale
By
George A. [Attorney signature]
Attorney Feb. 16, 1971 E. R. CASALE 3,563,114
FORWARD AND REVERSE PLANETARY GEARING
Filed July 22, 1969 2 Sheets-Sheet 2
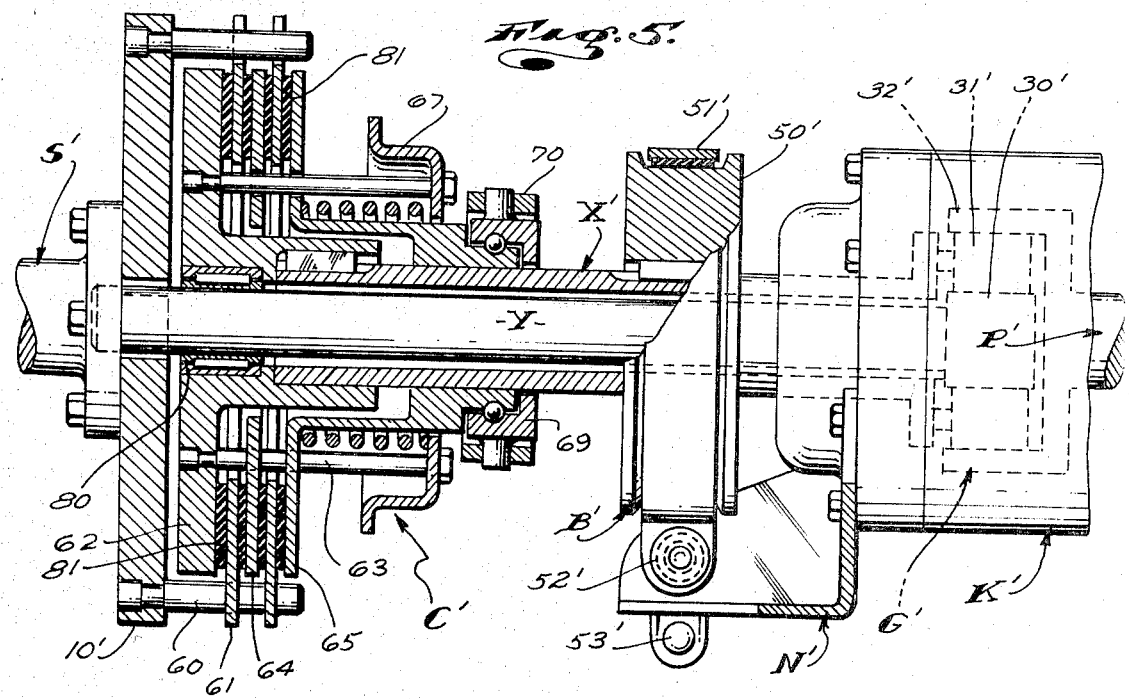
Inventor
Ernest R. Casale
By
George C. Maxwell
Attorney United States Patent Office
3,563,114
Patented Feb. 16, 1971

3,563,114
FORWARD AND REVERSE PLANETARY GEARING
Ernest R. Casale, Huntington Beach, Calif. (% Casale Engineering, 161 8th Ave., City of Industry, Calif. 92705)
Filed July 22, 1969, Ser. No. 843,507
Int. Cl. F16h 3/44
U.S. Cl. 74—792  15 Claims

ABSTRACT OF THE DISCLOSURE

A manually operable reversible transmission engageable between a power shaft and a propeller shaft including a manually operable clutch, a manually operable shaft braking means, and a planetary gear train, said clutch, brake means and gear train being related to the power and propeller shafts and with each other whereby disengagement of the clutch and braking means disengages drive between the shafts, engagement of the clutch establishes direct drive between the shafts and actuation of the braking means establishes gear reduced reverse drive between the shafts.

---

This invention relates to a power transmission and is more particularly concerned with a novel combination clutch and gear train for making and breaking drive between an internal combustion engine and a related propeller shaft and to selectively establish forward or reverse drive, that is, common or counter rotation between the engine and the propeller shaft when drive is established therebetween.

While my new power transmission is suitable for use in a large number of common and special installations and environments, it is particularly suitable for use in racing machines, such as racing automobiles, boats, and the like, which are driven by internal combustion engines having drive shafts, propeller shafts driven by the drive shafts and which transmit power to the wheels of the vehicles or the propellers of the boats and in which means must be provided between the drive and propeller shafts to make and break driving engagement therebetween and to selectively effect common or counter rotation between the shafts when the driving engagement therebetween is established.

In the art of racing machines of the general character referred to, it is desirable to keep and maintain all component parts and equipment as light as is possible and so that the greatest horsepower per pound ratio is obtained.

Still further, in many racing machines of the general character referred to, the horsepower per pound ratio is such and the operation of the equipment is such that when normal, forward driving engagement is established between the engine drive shaft and its related propeller shaft, a direct drive is established, that is, the shafts are driven in a common direction and at the same rotative speed.

As a result of the above, it has been the practice to forego the ability to establish reverse drive between the engine drive shaft and propeller shaft of a racing machine whenever possible and to provide only a clutch between the shafts to effect making and breaking of driving engagement therebetween and so that the weight of and the friction loss normally created by a reversible gear train can be eliminated.

While the above has been practiced, such practice is rapidly becoming outlawed in the sport of racing, as the inability of the vehicles or boats to be operated in reverse creates a multitude of problems in organizing and carrying out competitive events in a proper and orderly manner.

As a result of the above, those engaged in the racing arts are being forced to use and provide reversible transmissions in combination with clutches in the power transmissions of the machines.

The reversible transmissions provided by the prior art and which are suitable for use in present day racing machines are costly, complicated and extremely heavy mechanisms and are not, as a general rule, sufficiently strong or efficient to make their use desirable.

The direct drive, reversible transmissions provided by the prior art for use in racing machines are established by modifying standard multi-speed manually shiftable automobile transmissions and, in most cases, can be described as make-shift devices or mechanisms of questionable soundness and effectiveness. Such modified or make-shift transmissions generally consist of a standard transmission with certain parts removed therefrom and, while somewhat lighter than the original and complete transmissions, are still quite heavy and bulky.

In those cases where design and manufacture efforts have been made to provide a special transmission of the general character here concerned with, the results have been characterized by heavy gear boxes and costly, complicated and inefficient gear trains employing the same general principles and features of standard transmissions and can best be described as specially built, modified standard transmissions.

To the best of my knowledge, all reversible direct drive transmissions provided by the prior art which are suitable for use in present day racing machines are separable unitized units or components adapted to be engaged between the output shaft of a conventional clutch mechanism and a related propeller shaft and are in no other way cooperatively related to or incorporated in or with the clutch mechanisms, engine or propeller shaft.

An object of this invention is to provide a novel power transmission particularly suitable for use between the engine drive shaft and the propeller shaft of a racing machine to selectively make and break forward or reverse drive between the shafts and which includes an internal gear on the propeller shaft, a clutch mechanism on the drive shaft, a power shaft between the clutch mechanism and internal gear and a set of planetary gears meshed with the internal gear, a countershaft between the drive shaft and a pinion gear meshed with the planetary gears and brake means to selectively stop rotation of the power shaft whereby the countershaft and pinion rotate constantly, the power shaft and planetary gears rotate with the countershaft and pinion when the clutch is engaged to effect direct drive between the drive and the propeller shafts and the propeller shaft is driven in reverse or counter to the drive shaft when the clutch is released and the power shaft is stopped by the brake means.

It is an object of my invention to provide a power transmission of the character referred to above which is extremely light compared with standard clutch and reversible gear transmission assemblies and a power transmission which is extremely simple in construction and requires a relatively small number of rugged and durable parts which are easy and economical to manufacture, assemble and service.

Yet another object of my invention is to provide a power transmission of the character referred to which is such that it utilizes or incorporates any standard or conventional type of clutch means and any standard or conventional type of brake means.

Still further, the pinion, planetary and internal gears establish a small compact and light weight assemblage that can be satisfactorily housed and supported and can be satisfactorily related or connected with its related power, counter and propeller shafts in a multitude of different ways without departing from the spirit of this invention.

The foregoing and other objects and features of my invention will be understood and will be apparent from the following detailed description of typical preferred forms of the invention throughout which description reference is made to the accompanying drawings, in which:

FIG. 1 is an elevational view of a portion of an internal combustion engine with my new power transmission related thereto;

FIG. 2 is an isometric diagrammatic view of my new power transmission;

FIG. 3 is an enlarged detailed sectional view of one form of my invention;

FIG. 4 is a sectional view taken substantially as indicated by line 4—4 on FIG. 3;

FIG. 5 is a longitudinal view of another form of my invention with portions broken away and in section to illustrate details of construction.

The power transmission A that I provide is adapted to be engaged between the drive shaft S of an internal combustion engine E, at the rear end of the engine, and the forward end of a propeller shaft P which shaft is spaced rearward from and is in substantial axial alignment with the drive shaft.

The engine E can be the power plant for an automobile or other wheeled vehicle in which case the propeller shaft drives a differential gear or the like or it can be the power plant for a boat or other craft in which case the propeller shaft drives a screw or propeller.

The power transmission A includes, generally, a clutch means C, planetary gear means G, and brake means B.

The clutch means can be similar to a conventional single plate automotive clutch, as shown in FIG. 3 of the drawings, or can be a multiple plate type of clutch such as is shown at C' in FIG. 5 of the drawings.

The clutch C shown in FIG. 3 and which is diagrammatically illustrated in FIG. 2, is a standard single plate automotive type of clutch and includes, generally, a flywheel 10 fixed on a mounting flange 11 at the rear end of the engine drive shaft S by fastening means 12, an elongate output or power shaft X in axial alignment with, extending rearwardly from and rotatable relative to the shaft S and flywheel 10, a disc 14 with facings 15 in splined driving engagement on the shaft X and shiftable axially into and out of pressure engagement with the rear surface of the flywheel, an annular cover 16 carried by the flywheel 10 and projecting rearwardly therefrom and about the disc and shaft X, an annular pressure plate 17 within the cover and about the shaft X and shiftable into and out of engagement with the rear surface of the disc, pressure springs 18 carried by the cover and engaging and normally yieldingly urging the plate forwardly into engagement with the disc, a clutch release lever 19 carried by the cover, a clutch release sleeve 20 slidably and rotatably carried by the shaft X and engageable with the lever 19, a clutch release fork 21 engageable with the sleeve 20 and a manually operable lever arm 22 connected with the fork 21, urging the sleeve 20 forwardly to effect operation of the lever 19 and resulting rearwardly shifting of the plate 17 and the release of driving engagement between the plate, disc and flywheel.

In accordance with conventional clutch constructions, the foregoing elements and parts are encased within a bell housing H secured to the rear end of the engine E. The shaft X projects rearwardly from the housing to terminate at a predetermined distance therefrom, and the lever arm 22 is accessible at the exterior of the housing.

The clutch mechanism illustrated in FIG. 3 and described above is of normal or conventional construction, except for the fact that the power or output shaft is tubular and its forward end terminates rearward of the flywheel 10.

Ordinarily, the output shafts of clutches of the type here employed are solid shafts and their front ends are rotatably supported in a pilot bearing in the rear end of the drive shaft and/or in the center of the flywheel.

The construction that I provide further includes a countershaft Y within the power shaft X. The shaft Y is a solid shaft and has front and rear ends. The front end of the shaft Y projects forwardly from the front end of the shaft X and is fixed to the flywheel and/or drive shaft S. In the case illustrated, the shaft Y is shown provided with a mounting flange 25 at its front end, which flange is engaged between the flange 11 of the shaft S and the flywheel 10, and is secured thereto and therebetween by the fastening means 12.

It will be apparent that the shaft Y can be secured to the shaft S and/or wheel 10 in a number of different ways without departing from the spirit of this invention.

The forward end of the shaft X is shown rotatably supported on and about the shaft Y by a suitable sleeve bearing 26.

The rear end of the shaft Y is rotatably supported in the shaft X by bearing means 27 and projects rearwardly from the rear end of the shaft X.

The shaft Y and its related bearings 26 and 27 can be considered as elements or parts of the clutch means C, as these parts are incorporated in the clutch means.

The planetary gear means G includes a central pinion gear 30 on the rear end of the shaft Y, a plurality (three) of planetary gears 31 about the pinion gear and rotatably carried by the shaft X and an internal gear 32 on the front end of the propeller shaft P and engaged with and about the planetary gears 31.

The planetary gears are rotatably carried by circumferentially spaced axially extending shafts or axle pins 34, the ends of which are engaged in and supported by axially spaced end walls or flanges 35 of an annular cage carried by the shaft X. The cage has a cylindrical side wall 36 with radially opening ports or windows 37 through which the gears 31 project to engage the internal gear.

The internal gear 32 is formed integrally with and projects forwardly from a flange 38 on the front end of a central axially extending tubular mounting sleeve 39 in which the forward end of the shaft P is engaged and suitably fixed. The shaft P can be keyed to its sleeve 39, splined therewith or welded thereto, as illustrated.

In the case illustrated a sectional gear box K is provided to enclose the planetary gear means. The box K has a cylindrical central portion which occurs about the gears and end portions with central openings through which the shafts P and X freely project and in which suitable bearing means 40 and 41 are provided to rotatably support the shafts X and P within the housing.

In practice, the gear box K is held fixed against rotation. To effect holding the box fixed, I provide mounting means N adapted to be secured to and extend between the gear box and suitably adjacent structure, such as a vehicle frame or the engine stringers in a boat (not shown). The means N, in the simplest form consists of an elongate mounting bar 45 extending transverse the forward end of the gear box and to which the gear box is secured by means of axially extending screw fasteners 46 accessible at the forward end of the gear box and which are provided to secure sections of the gear box together.

Since other details of construction and the relationship of parts going to make up the means G, box K and mounting means N can vary widely without departing from the spirit of this invention, I will not burden this specification with further detailed description of the particular construction illustrated.

The brake means B is adapted to selectively engage, hold and stop the shaft X against rotation. The means B can vary widely in form and in FIGS. 1, 2 and 3 of the drawings, is shown as a spot or disc-brake construction comprising a flat, radially extending, axially disposed brake disc 50 fixed on the shaft X between the clutch C and gear box K and a caliper unit 51 embracing the outer peripheral portion of the disc at one side thereof and having axially opposed braking pads 52 opposing and adapted to be shifted into and out of pressure braking engagement on and with the opposite surfaces of the disc.

The caliper unit 51 can be a conventional, hydraulic disc-brake caliper unit, a mechanical unit or a combination mechanical hydraulic unit, and is shown provided with a suitable manually or mechanically operable operating lever arm 53.

The unit 51 must be mounted in fixed relationship and can be mounted by separate or special mounting means, can be mounted on the bell housing H of the clutch C, can be mounted on the gear box K, or, as illustrated, can be secured to and carried by the mounting means N. The unit 51 is shown secured to the bar 45 of the means N by fastener means 54.

With the construction set forth above and assuming the engine E is operating and the shaft S is rotating clockwise, the flywheel 10 and the shaft Y with the gear 30 therein rotate clockwise therewith.

If the clutch means C is released and the brake means B is released, the shaft X is free to rotate relative to the flywheel 10 and the shaft Y. Under such circumstance, the gear 30, rotating within the series of planetary gears 31, carried by the shaft X and within the internal gear 32, are driven by the gear 30 and rotate idly about and relative to the gears 30 and 32 and the shaft X is rotated clockwise and at a reduced rate of speed relative to the speed of the shaft Y and flywheel 10. The propeller shaft P is not driven and the construction is in its unactuated position where drive between the shafts S and P is broken.

When it is desired to make direct forward driving engagement between the shafts S and P, that is, driving engagement wherein the shafts S and P are driven in common clockwise direction at the same speed, the clutch means C is engaged, that is, the clutch disc 14 on the shaft X is urged into driving engagement between the flywheel 10 and pressure plate 17, by means of the springs 18 and under control of the lever arm 22. When the clutch means is thus engaged, the shaft X is driven in the same direction and at the same speed as the shaft Y and the gears 30 and 31 are rotated as a unit to drive the shaft P directly. It will be noted that when the construction is in direct forward drive, the planetary gears 32 do not rotate and, in effect, key the shafts X, Y and P together directly.

When it is desired to establish reduced reverse drive between the shafts S and P, the clutch means C is released and the brake means B is set or locked. When the brake means B is locked, the shaft X is held against rotation and the gear 30 on the shaft Y rotates the planetary gears 31 counterclockwise, which gears drive the internal gear 32 and the shaft P, counterclockwise.

The speed reduction between the shafts S and P when the construction is in reverse drive is a function of the relative diameter of the gears 30, 31 and 32, and can be varied as desired or as circumstances require.

In the form of the invention illustrated in FIG. 5 of the drawings, the means G' is the same as the means G in the first form of the invention and includes a gear box K' in which gears 30', 31' and 32' are arranged, said gears being related to shafts X', Y' and P' similar to and in the same relationship as in the first form of the invention.

The gear box K' is supported by mounting means N' similar to and in substantially the same manner as is the box K supported by the means N.

The brake means B' in the second form of the invention is shown as a band type braking means and includes a brake wheel or drum 50' fixed to and carried by the shaft X' forward of the gear box K', and a lined brake band 42' engaged about the drum. The band is selectively shiftable into and out of braking engagement about the drum by means of a suitable actuating means 51', which means is fixed to the means N' and includes an operating lever 53'.

The clutch means C' in this second form of the invention is a form of multiple plate type clutch and while it differs substantially from the clutch means C in the first form of the invention, as regards details of construction, it serves the same end as does the clutch means C and accomplishes that end in substantially the same way.

Referring to the details of the clutch means C', said means includes a flywheel 10' secured to the engine drive shaft S', a plurality of circumferentially spaced drive pins 60 about the outer peripheral portion of and projecting rearwardly from the flywheel, a plurality (two) of annular drive discs 61 carried by the pins 60, a drive plate 62 on and keyed to the forward end of the tubular shaft X' and occurring between the flywheel and the forward drive plate, a plurality of circumferentially spaced drive pins 63 about and projecting rearwardly from the drive plate to project freely through the annular drive discs 61, an annular driven disc 64 carried by the pins 63 and projecting between the discs 61, a pressure plate 65 adjacent the rear end of the rearmost disc 61 and engaged within the pins 63 and carried by a sleeve 66 slidably carried by the shaft X, an annular spring seat ring 67 carried by the rear end pins 63, a compression spring 68 between the ring 67 and the pressure plate 65 to normally yieldingly urge the plate 65 forwardly toward the drive plate 62 and to urge the discs 61 and 64 into driving frictional engagement with the plates 62 and 65. Finally, the means C' includes releasing means with a collar 69 rotatably carried by the sleeve and a yoke 70 engaging the collar, said yoke having an operating lever, or the like (not shown) to facilitate urging the collar 69, sleeve 66 and plate 65 rearwardly relative to the discs 61 and 64 and to thereby break driving engagement through the clutch construction and between the shafts X and S.

In this form of the invention the forward end of the central countershaft Y' extends through an opening in the flywheel 10' and is keyed thereto. The shaft X' can extend forwardly through the flywheel 10' and into a socket opening in the rear end of the shaft S', which opening is commonly provided to receive a pilot bearing for the central shafts of conventional clutch means.

The drive plate 62 is shown rotatably supported on and about the forward end portion of the shaft Y' by an anti-friction roller bearing 80 and the forward end of the shaft X' is engaged in, supported by and keyed to a rearwardly projecting sleeve formed integrally on the drive plate.

In accordance with conventional clutch constructions, the drive discs 61 can be provided with suitable alinings 81.

If necessary or desired, the clutch means C' can be provided with a bell housing, or the like.

It will be apparent that this second form of the invention functions in substantially the same way and achieves or gains the same end results as the first form of the invention.

In light of the foregoing, it will be apparent that, in practice, the housed or encased planetary gear means that I provide can vary considerably in details of construction and that such a gear means can be related to substantially any suitable clutch which is such that its central output shaft can be made tubular to accommodate a countershaft to connect between the drive shaft of a related engine and the center pinion gear of the gear means and an output shaft which is such that it can accommodate and be stopped by substantially any suitable brake means.

Having described only typical preferred forms and applications of my invention, I do not wish to be limited or restricted to the specific details herein set forth, but wish to reserve to myself any modifications and/or variations which may appear to those skilled in the art.

Having described my invention, I claim:

1. A power transmission of the character referred to comprising an elongate drive shaft with front and rear ends, an elongate propeller shaft with front and rear ends and spaced rearward of and in substantial alignment with the drive shaft, a gear means including an internal gear on the forward end of the propeller shaft, a central pinion gear and an annular series of planetary gears between the pinion and internal gears, a central shaft between the drive shaft and pinion gear, an elongate tubular power shaft with front and rear ends about the central shaft with its rear end connected with the series of planetary gears, clutch means between the front end of the power shaft and drive shaft to selectively make and break driving engagement with and between the drive and power shafts and brake means on and related to the power shaft to selectively stop rotation of said power shaft.

2. A structure as set forth in claim 1 wherein said brake means includes a caliper unit mounted in fixed position relative to the pinion shaft and inclduing a pair of axially spaced, opposing brake pads towards each other and a brake disc fixed on the power shaft between the clutch and gear means and extending radially outwardly therefrom and between said pads.

3. A structure as set forth in claim 1 wherein said brake means includes a brake drum on the power shaft between the clutch and gear means, a brake band engaged about the drum and operating means anchoring the band in fixed rotative position and operable to selectively urge the band into and out of braking engagement with the drum.

4. A structure as set forth in claim 1 wherein said gear means is enclosed in a case and said case is supported in fixed non-rotative position by mounting means fixed to and between the case and a supporting structure.

5. A structure as set forth in claim 4 wherein said brake means includes a caliper unit mounted in fixed position relative to the pinion shaft and including a pair of axially spaced, opposing brake pads towards each other and a brake disc fixed on the power shaft between the clutch and gear means and extending radially outwardly therefrom and between said pads.

6. A structure as set forth in claim 4 wherein said brake means includes a brake drum on the power shaft between the clutch and gear means, a brake band engaged about the drum and operating means anchoring the band in fixed rotative position and operable to selectively urge the band into and out of braking engagement with the drum.

7. A structure as set forth in claim 1 wherein said clutch means includes a flywheel on the rear end of the drive shaft, a pressure plate spaced rearward of the flywheel, a drive plate on the forward end of the power shaft and means operable to selectively shift the drive plate toward and away from the flywheel and to establish and release frictional driving engagement of the disc between said flywheel and plate.

8. A structure as set forth in claim 7 wherein said gear means is enclosed in a case and said case is supported in fixed non-rotative position by mounting means fixed to and between the case and a supporting structure.

9. A structure as set forth in claim 7 wherein said brake means includes a caliper unit mounted in fixed position relative to the pinion shaft and including a pair of axially spaced, opposing brake pads towards each other and a brake disc fixed on the power shaft between the clutch and gear means and extending radially outwardly therefrom and between said pads.

10. A structure as set forth in claim 7 wherein said gear means is enclosed in a case and said case is supported in fixed non-rotative position by mounting means fixed to and between the case and a supporting structure.

11. A structure as set forth in claim 10 wherein said brake means includes a caliper unit mounted in fixed position relative to the pinion shaft and including a pair of axially spaced, opposing brake pads towards each other and a brake disc fixed on the power shaft between the clutch and gear means and extending radially outwardly therefrom and between said pads.

12. A structure as set forth in claim 10 wherein said brake means includes a brake drum on the power shaft between the clutch and gear means, a brake band engaged about the drum and operating means anchoring the band in fixed rotative position and operable to selectively urge the band into and out of braking engagement with the drum.

13. A structure as set forth in claim 1 wherein said clutch means includes a flywheel on the rear end of the drive shaft, a plurality of axially spaced drive discs carried by the flywheel and spaced rearward thereof, a plurality of driven discs carried by the power shaft and engaged between the drive discs in alternating series therewith and operating means to selectively urge the series of discs into and out of frictional driving engagement with each other.

14. A structure as set forth in claim 13 wherein said gear means is enclosed in a case and said case is supported in fixed non-rotative position by mounting means fixed to and between the case and a supporting structure.

15. A structure as set forth in claim 13 wherein said brake means includes a caliper unit mounted in fixed position relative to the pinion shaft and including a pair of axially spaced, opposing brake pads towards each other and a brake disc fixed on the power shaft between the clutch and gear means and extending radially outwardly therefrom and between said pads.

References Cited

UNITED STATES PATENTS

| | | | |
|---|---|---|---|
| 1,767,933 | 6/1930 | Ledwell | 74—792 |
| 2,757,558 | 8/1956 | Stoeckicht | 74—792 |
| 2,867,136 | 1/1959 | Albinson et al. | 74—792X |

FOREIGN PATENTS

| | | | |
|---|---|---|---|
| 332,044 | 1/1921 | Germany | 74—792 |

BENJAMIN W. WYCHE, Primary Examiner

U.S. Cl. X.R.

192—18